United States Patent

[11] 3,603,695

[72] Inventor Mitsuhisa Yokota
 Kanagawa-ken, Japan
[21] Appl. No. 839,310
[22] Filed July 7, 1969
[45] Patented Sept. 7, 1971
[73] Assignee Tokyo Shibaura Denki Kabushiki Kaisha
 (also known as Tokyo Shibaura Electric Co., Ltd.)
 Kawasaki-shi, Kanagawa-ken, Japan
[32] Priority July 8, 1968
[33] Japan
[31] 43/47146

[54] BLEEDER AND BACK-PRESSURE TURBINE CONTROL SYSTEM
 9 Claims, 1 Drawing Fig.
[52] U.S. Cl. .................................................. 415/17
[51] Int. Cl. ............................................. F01b 25/00
[50] Field of Search ........................................... 415/17

[56] References Cited
UNITED STATES PATENTS

| | | | |
|---|---|---|---|
| 3,097,488 | 7/1963 | Eggenberger et al. ........ | 415/17 |
| 3,238,376 | 3/1966 | Ernst et al. .................... | 415/17 |
| 3,288,160 | 11/1966 | Eggenberger et al. ........ | 415/17 |
| 3,342,195 | 9/1967 | Wagner ....................... | 415/17 |

Primary Examiner—C. J. Husar
Attorneys—Robert E. Burns and Emmanuel J. Lobato

ABSTRACT: Disclosed herein is a bleeder and back pressure turbine control system composed, essentially, of control devices respectively for rotational speed control, back pressure control, and bleeder pressure control, each control device detecting the required value and sending out a control signal; switching means operable for changing turbine operation to a constant speed operation or to a constant pressure operation, the back pressure control device being disconnected from the control system in the former operation, and the rotating speed control device being disconnected from the control system in the latter operation; and electrohydraulic control devices which, in the former operation, operate a main steam-regulating valve and a bleeder-regulating valve in the same directions under the control of the speed control device, and in the reversing directions under the control of the bleeder pressure control device, and which, in the latter operation, operate merely the main steam-regulating valve under the control of the back pressure control device and the bleeder pressure control device.

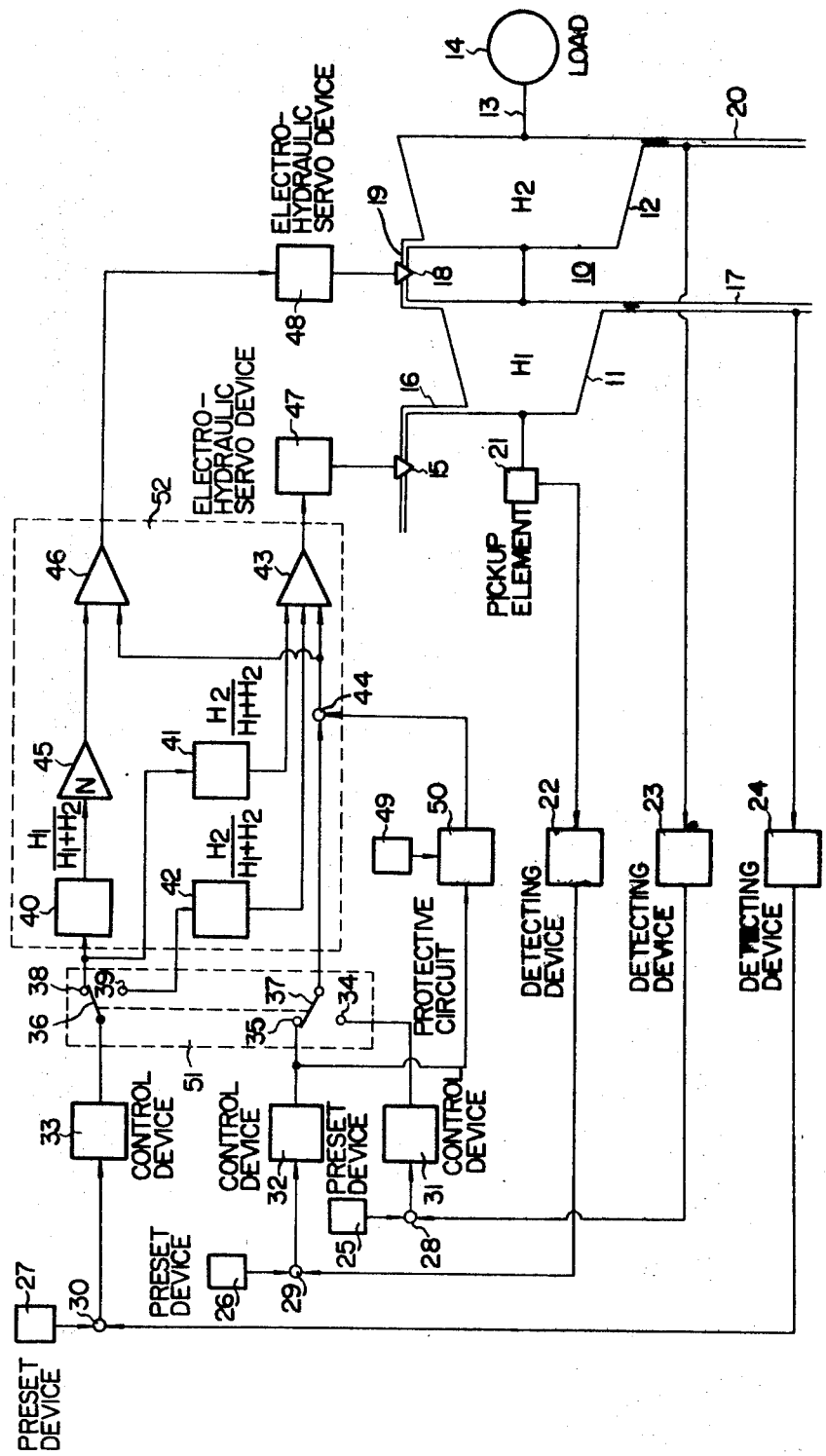

3,603,695

BLEEDER AND BACK-PRESSURE TURBINE CONTROL SYSTEM

BACKGROUND OF THE INVENTION

This invention relates to a control system for a bleeder and back pressure turbine, and more particularly to a type thereof wherein the control may be switched to either constant speed operation or constant pressure operation. As parameters to be controlled in these operations, there are rotational speed, bleeder pressure, and back pressure. However, these three parameters are almost never controlled simultaneously, and in the case of constant speed operation, merely the rotating speed and the bleeder pressure are controlled at desired values, and in the case of constant pressure operation, the bleeder pressure and the back pressure of the turbine are controlled at desired values. The above-described control is carries out by operating a main steam-regulating valve for regulating the steam flowrate from the steam generator to the high-pressure turbine and a bleeder-regulating valve for regulating the steam flowrate from the high-pressure turbine to the low-pressure turbine.

In a typical example of heretofore known control systems, a specific regulating lever is employed, and the control is thereby switched to either constant speed operation or constant pressure operation. However, in such a control system, the operations of the main steam-regulating valve and the bleeder-regulating valve are similar in both of the above-described operations, and, for this reason, the quick response feature in the constant pressure operation is lost, thus constituting a drawback of the conventional control device.

SUMMARY OF THE INVENTION

Therefore, the principal object of the present invention is to provide a novel control system for a bleeder and back pressure turbine wherein the operation of the turbine can be easily switched to either constant speed operation or constant pressure operation, thus affording a superior operational characteristic particularly in the latter operation and a stable control feature in both of the operations.

Another object of the present invention is to provide a novel control system for a bleeder and back pressure turbine including a safety device for overspeed of a value not sufficiently high to operate the emergency governor, thereby providing protection against overspeed at the time of the constant pressure operation.

These and other objects of the present invention can be achieved by a novel organization of the bleeder and back pressure turbine control systems according to this invention which comprises a rotational speed control device, a back pressure control device, a bleeder pressure control device, a switching means which at the time of constant speed operation disconnects said back pressure control device from the control system and at the time of constant pressure operation disconnects said speed control device from the control system, and electrohydraulic control devices which, when the switching means is operated to the constant speed operation side, operate a main steam-regulating valve and a bleeder-regulating valve in the same directions under the control of the speed control device and in the reversing directions under the control of the bleeder pressure control device, and which, when the switching means is operated to the constant pressure operation side, operate merely the main steam-regulating valve under the control of the back pressure control device and the bleeder pressure control device.

The nature, principle, and utility of the invention will be more readily apparent from the following detailed description with respect to a preferred embodiment of the invention when read in conjunction with the accompanying drawing.

BRIEF DESCRIPTION OF THE DRAWING

The single FIGURE in the accompanying drawing is a block diagram showing an example of the bleeder and back pressure turbine control system according to the present invention.

DETAILED DESCRIPTION OF A PREFERRED EMBODIMENT

Prior to entering into a detailed description of a preferred embodiment of the present invention, the principle of the present invention will be disclosed.

In constant speed operation, if the turbine speed increases or decreases, it is necessary to decrease or increase the turbine output. However, if the flow rate of steam flowing from the turbine to the bleeder line (this quantity is simply called a bled amount) is varied, as by using the steam for changing the output of the turbine, the steam pressure in the bleeder line (this is called the bleeder pressure) is also changed. In this connection, it is assumed that the load connected to the bleeder line is not varied. Accordingly, if the flow rate of steam supplied from a steam generating plant to the turbine is varied with simultaneous regulation of the bleeder-regulating valve, which controls the quantity of steam flowing from the high-pressure turbine to the low-pressure turbine, and the bled amount is thereby maintained constant, the turbine output can be varied while the bleeder pressure is maintained at a constant value. That is, the main regulating valve and the bleeder-regulating valve are regulated in the same directions respectively so that the flow rate of steam passing through the main steam-regulating valve and the flow rate of steam passing through the bleeder-regulating valve are equally varied at a ratio determined from a speed-regulating ratio of the turbine.

Likewise in constant speed operation, when the flow rate of steam flowing from the bleeder line to the load is increased or decreased, the bleeder pressure is decreased or increased, and it is required that the bled amount of the steam be increased or decreased in correspondence thereto. In this case, it is assumed that the turbine load is not changed. For the purpose of maintaining the bleeder pressure at a constant value by varying the bled amount, it is necessary that the main steam-regulating valve and the bleeder regulating valve be operated in opposite directions, such that when the main steam-regulating valve is shifted by $KH2$, the bleeder-regulating valve is shifted by $-KH1$, wherein K is an appropriate constant, H1 is the thermal drop in the high-pressure turbine, and H2 is the thermal drop in the low-pressure turbine.

On the other hand, in constant back pressure operation, when it is desired to maintain the exhausted flow of steam at a constant value with a varied bled amount, merely the main steam-regulating valve is shifted so that the flow rate of steam passing through the main steam-regulating valve is thereby varied to a desired value, and thus the flow rate of steam passing through the bleeder-regulating valve is maintained constant. Also, if it is desired to maintain the bled amount constant with the exhaust flow being changed, the flow rates of steam passing through the main steam-regulating valve and the bleeder-regulating valve should be varied by an equivalent quantities corresponding to the varied flow of the exhausted steam. This operation is quite similar to the operation, as described above, for maintaining the bled amount at a constant value during constant speed operation and when the output of the turbine is varied.

Although the present invention is also applicable to a bleeder and back pressure turbine having a plurality of bleeder states, it will hereinafter be illustrated and described with respect to an example having a simpler organization for the purpose of simplifying the description.

In such an example, there are provided a high-pressure turbine 11 and a low-pressure turbine 12, and these two when combined are designated by numeral 10. A shaft which is common to both of the turbines 11 and 12 is directly coupled to a load 14 such as an electric power generator. The entrance side of the high-pressure turbine 11 is connected to a main steam pipeline 16 having a main steam-regulating valve 15 at a suitable position thereof, and the other end of the main steamline 16 is connected to a steam generating plant (not shown). At the exit side of the high-pressure turbine 11, there are provided a bleeder line 17 and a steam line 19, the latter interconnecting the high-pressure turbine 11 and the low-pressure turbine 12 and having a bleeder regulating valve 18 therein. The exit side of the low-pressure turbine 12 is connected to an exhaust line 20.

For picking up the rotational speed of the common shaft 13, an electromagnetic pickup element 21 is provided at a suitable position on the shaft 13, and this element 21 with the cooperation of a detecting device 22 detects the rotational speed of the shaft 13, and delivers an electric signal in proportion to the speed thus detected. Likewise, there are also provided detecting devices 23 and 24 for determining pressures in the bleeder line 17 and the exhaust line 20, which are hereinafter called bleeder pressure and back pressure, respectively, and the thus measured quantities are thereby converted into electric signals.

Electric signals delivered from the detecting devices 22, 23 and 24 are then supplied into comparators 28, 29, and 30, and therein compared with preset signals coupled from presetting devices 25, 26, and 27 in accordance with the desired optimum values such as the back pressure, speed of the shaft, and the bleeder pressure. The comparators 28, 29, and 30 are connected to a back pressure controlling device 31, a rotational speed control device 32, and a bleeder pressure-controlling device 33, respectively, which may be of well-known types.

In constant speed operation, signals from the control devices 32, 33 are employed for controlling electrohydraulic servo devices 47 and 48 which in turn control the main steam regulating valve 15 and the bleeder regulating valve 18, respectively, and, in constant pressure operation, signals from the control devices 31, 33 are employed for controlling the same electrohydraulic servo devices 47 and 48. For this purpose, there are also provided a switch means 51 to be operated for selecting signals depending on the operational modes, and operational circuits which are as a whole designated by numeral 52 and which convert the thus switched signals to other types of signals adapted to control the servo devices 47, 48.

The control signal-generating portions of the above-described back pressure controlling device 31 and the rotating speed control device 32 are connected to contacting terminals 34, 35, respectively, which are included in the above-described switch means 51. Either one of the above-described contacts 34 and 35 is contacted by a movable contact 37. Furthermore, the control signal-generating portion of the above-described bleeder pressure control device 33 is connected to another movable contact 36 which is operable interlinkedly with the movable contact 37.

At the time of constant speed operation, the movable contacts 36 and 37 are thrown into contact with the contacts 38 and 35, respectively, while in constant pressure operation, the movable contacts 36 and 37 are placed in contact with the contacts 39 and 34, respectively. The contact 38 is further connected to gain controllers 40, 41, and the contact 39 is connected to another gain controller 42. The above-mentioned gain controllers 41, 42 are connected to an adder 43, and the above-described movable contact 37 is connected through a comparator 44 to the same adder 43. The above-mentioned gain controller 40 is then connected through a polarity changer 45 to another adder 46.

These gain controllers 40, 41, and 42 are so adjusted that the output signals therefrom, at the time an equal amount of input signals are applied thereto, are in such a relations as $H_1/(H_1+H_2)$; $H_2/(H_1+H_2)$; $H_2/(H_1+H_2)$, wherein $H_1$ and $H_2$ are the thermal drops due to the high-pressure turbine 11 and the low pressure turbine 12, respectively.

Furthermore, the output of the comparator 44 is also connected with the adder 46, and the output of the former adder 43 is electrically connected to an electrohydraulic servo device 47 coupled mechanically to the main steam valve 15 for opening and closing the same valve 15, while the adder 46 is electrically connected to another electrohydraulic servo device 48 coupled to the bleeder regulating valve 18 for similar purpose.

In the above-described arrangement according to the present invention, a protective measure against accidental overspeeding of the turbine at the time of the constant pressure operation is provided. More specifically, a protective circuit 50 is interposed between the control signal-generating portion of the rotating speed control device 32 and the above-described comparator 44, said protective circuit 50 being capable of issuing an electric signal for controlling the main steam-regulating valve 15 and the bleeder regulating valve 18 to close the same abruptly when the controlling signal generated from the control device 32 exceeds a preset value in an insensible zone setting device 49.

The operation of the bleeder and back pressure turbine control system according to the present invention will now be described.

The steam generated in a steam-generating plant (not shown) and supplied through the main steam line 16 to the high-pressure turbine 11 is controlled by the main steam-regulating valve 15, and after imparting energy to the turbine 11, one part of the steam is thereafter controlled by the bleeder-regulating valve 18 and passed through the pipeline 19 to the low-pressure turbine 12, while the other part of the steam is thereafter passed into the bleeder line 17. The low-pressure turbine 12 drives the load 14 through the common shaft 13, and the steam from the turbine 12 is exhausted through the exhaust line 20. The operation thereafter of the turbine control system according to the present invention will be described with respect to each of the following operational modes.

(1) Constant Speed Operation

The movable contacts 37 and 36 are thrown into contact with the contact points 35 and 38, respectively. At this time, the part of the control system corresponding to the back pressure control is completely freed because the movable contact 37 does not come into contact with the contact 34. A valve-controlling signal corresponding to a speed error signal generated from the rotating speed control device 32 is then passed through the movable contact 37 to both of the adders 43 and 46. This control signal operates the electrohydraulic servo devices 47 and 48 simultaneously thereby to open or close the main steam-regulating valve 15 and the bleeder-regulating valve 18 in the same directions and to vary the flow rates through these valves by the same amount, whereby the turbine output is varied to follow the variation of the load, the quantity of the bled steam and hence the bleeder pressure being kept constant.

On the other hand, a valve control signal corresponding to the error signal generated from the above-described bleeder pressure control device 33 is transmitted, after being passed through the contact 36, via the gain control device 40 and the polarity changer 45 to the adder 46, and also via the gain control device 41 to the adder 43. Thus, the gain control devices 40 and 41 convert the control signal to values corresponding to the thermal drop ratio between the high-pressure turbine 11 and the low-pressure turbine 12, and the polarity changer 45 changes the polarity of the control signal in such a manner that the open and closing directions of the main steam-regulating valve 15 and the bleeder-regulating valve 18 are thereby converted in a reversed relation.

In this manner, the flow rates passing through the main steam-regulating valve 15 and the bleeder-regulating valve 18 are increased or decreased, or decreased or increased, respectively, in a ratio conforming to the thermal drop ratio between the high-pressure turbine 11 and the low-pressure turbine 12, whereby the output of the turbine can be maintained at a constant value with simultaneous control of the bleeder pressure at a constant value.

(2) Constant Pressure Operation

In the constant pressure operation, the composite switch 51 is so operated that the movable contacts 36 and 37 are transferred to the positions 39 and 34, respectively. With this transferring operation, the control circuit for the rotational speed of the turbine is completely freed from the system by the movable contact 37. A valve control signal corresponding to a back pressure error signal generated from the back pressure control device 31 is passed through the contacts 37 and 34 and the comparator 44 to both of the adders 43 and 46, the electrohydraulic servo devices 47, 48 being thereby operated so that the main steam-regulating valve 15 and the bleeder-regulating valve 18 are shifted in the same directions for varying the flow rates of steam passing through these valves by an equal amount, whereby the flow rate of the exhausted steam and hence the back pressure of the low-pressure turbine can be regulated without varying the bled quantity of steam.

The control signal from the bleeder pressure control device 33 is sent through the movable contact 36, the contacting position 39, and the gain controller 42 to the above-described adder 43, the electrohydraulic servo device 47 being thus operated, and the main steam-regulating valve 15 is thereby open or closed. This operation permits control of the flow rate of steam through the main steam-regulating valve without varying the steam flow rate through the bleeder-regulating valve 18, whereby the back pressure of the low-pressure turbine is controlled to a desired value.

When the turbine over speeds for some reason such as loss of the load, the rotating speed control device 32 creates a signal causing the abrupt closure of the valves. If the value of the signal exceeds a preset value in the insensible zone-setting device 49, the protecting device 50 creates an output. The output from the protecting device 50 takes precedence over the signal from the back pressure control device 31, and the main steam-regulating valve 15 and the bleeder-regulating valve 18 are instantaneously closed. The insensible zone-setting device has been preset to such a value that the protecting circuit 50 creates the above-described output at an overspeed value, at which the emergency governor of the turbine will not yet operate and at which the protecting device 50 will not operate at the normal running speed of the turbine.

As described above, according to the present invention, electrohydraulic control devices are employed instead of the conventional mechanical control methods, so that the running and control characteristics at the time of constant speed operation and constant pressure operation can be remarkably improved, and so that a quick response is realized during constant pressure operation.

The bleeder and back pressure turbine control device according to this invention is advantageous in that the signal from the bleeder pressure control device, in constant speed operation, operates the main steam-regulating valve and the bleeder-regulating valve in reversing directions and in a manner corresponding to the thermal drop ratio of the high-pressure turbine and the low-pressure turbine, and at the constant pressure operation, the desired operational characteristic can be obtained by merely open or closing the main steam-regulating valve.

Furthermore, the turbine control system makes possible switching, of its operation between constant speed operation and constant pressure operation by means of a transfer switch, and the malfunctioning effect on the back pressure due to the conventional mechanical control methods is completely eliminated. Moreover, the quick response to a desired operational characteristic and also a stable condition of the operation can be obtained by the above-described measure; and, with the provision of a protecting device for preventing turbine overspeed, the operation of the turbine is made far safer and more stable than with the conventional control method.

I claim:

1. A bleeder and back pressure turbine control system comprising a rotational speed control means for electrically detecting the rotational speed of the turbine and for sending out a control signal, a back pressure control means for electrically detecting the back pressure of the turbine and for sending out another control signal, bleeder pressure control means for electrically detecting the bleeder pressure of the turbine and for sending out still another control signal, a main steam-regulating valve and a bleeder-regulating valve connected to said turbine, electrohydraulic control means for selectively opening and closing said main and bleeder valves, a switching means coupled to each of said back pressure, bleeder pressure, and speed control means, said switching means having a first position for constant speed operation wherein said switching means disconnects said back pressure control device from the control system and having a second position for constant pressure operation wherein said switching means disconnects said rotating speed control device from the control system, and signal control means connected between said switching means and said electrohydraulic control means for causing said main and bleeder valves to open and close in the same direction under the control of said speed control means, and to open and close opposingly to each other under the control of said bleeder pressure control means, when said switching means is in said first position for said constant speed operation, and for causing both said valves to open and close in the same direction under the control of said back pressure control means, and said main steam-regulating valve to open and close under the control of said bleeder pressure control means, when the switching means is in said second position for said constant pressure operation.

2. A bleeder and back pressure turbine control system as set forth in claim 1, further comprising over speed protection means connected to said control system and which, when the turbine over speeds during the constant pressure operation, receives said control signal from the rotating speed control means and operates said electrohydraulic control means in a manner such that said main steam-regulating valve and said bleeder-regulating valve are thereby instantaneously closed.

3. A bleeder and back pressure turbine control system as defined in claim 1 wherein said electrohydraulic control means consists of two units of similar organization and connected respectively to said main steam regulating valve and said bleeder-regulating valve.

4. A bleeder and back pressure turbine control system as defined in claim 1 wherein each of said rotational speed control, back pressure control, and bleeder pressure control means comprises a detector means inclusive of a detecting element, a preset means for presetting an optimum value of, for instance, the rotational speed, bleeder pressure, or back pressure, a comparator means having an output and having inputs connected to said detector and preset means for comparing the detected value with the preset value, and a control means connected to said comparator means output for producing a control signal.

5. A bleeder and back pressure turbine control system as defined in claim 1, in which said signal control means comprises three gain controllers, a polarity changer, two adders, and means coupling together said controllers, changer and two adders for causing said electrohydraulic control means to control said main steam-regulating valve and the bleeder-regulating valve in proportion to a thermal drop ratio in the high-pressure and the low-pressure turbines.

6. A bleeder and back pressure turbine control system as defined in claim 5, in which said gain controllers produce output signals, under conditions of equal inputs to said controllers, defined by the respective expressions: $H_1/(H_1+H_2)$; $H_2/(H_1+H_2)$; $H_2/(H_1+H_2)$; wherein $H_1$ and $H_2$ are the thermal drops due to a high-pressure portion and a low-pressure portion of said turbine, respectively.

7. In a turbine having a main steam input regulating valve, a bleeder valve, and bleeder and exhaust passages, an improved turbine control system comprising, speed detecting and control means connected to the turbine for producing an electrical signal which is proportional to the rotational speed of the turbine as compared to a predetermined speed signal level; back pressure detecting and control means connected to the turbine exhaust passage for producing an electrical signal which is proportional to a pressure within the exhaust passage as compared to a predetermined back pressure signal level; bleeder pressure detecting and control means connected to the bleeder passage of the turbine for producing an electrical signal which is proportional to a pressure within the bleeder passage as compared to a predetermined bleeder pressure signal level; first electrohydraulic control means connected to the main steam input regulating valve for actuation to selectively open and close said main valve; second electrohydraulic control means connected to said bleeder valve for actuation to selectively open and close said bleeder valve; signal control means electrically connected to said first and second electrohydraulic control means for producing signals for actuating said first and second electrohydraulic control means; and switching means having a first constant speed-controlling position and a second constant pressure controlling position, said switching means being connected between said signal control means and said speed, back pressure, and bleeder pressure detecting and control means for coupling said bleeder pressure and speed detecting and control means to said signal control means when said switching means is in said first position, and for coupling said bleeder pressure and back pressure detecting and control means to said signal control means when said switching means is in said second position, said signal control means comprising means for actuating said first and second electrohydraulic means, when said switching means is in said first position, to open and close said main and bleeder valves together in response to said signals produced by said speed detecting and control means, and to open and close said main and bleeder valves in opposition in response to said signals produced by said bleeder pressure detecting and control means, and said signal control means further comprising means for actuating said first and second electrohydraulic means, when said switching means is in said second position, to open and close said main and bleeder valves together in response to said signals produced by said back pressure detecting and control means, and to open and close said main valve in response to said signals produced by said bleeder pressure detecting and control means.

8. An improved turbine control system as set forth in claim 7, further comprising overspeed protective circuit means connected to said speed detecting and control means and said signal control means for producing an electrical signal for causing said signal control means to actuate said first and second electrohydraulic means to close said main and bleeder valves in response to an overspeed condition detected by said speed detecting and control means.

9. An improved turbine control system as set forth in claim 7, in which said speed detecting and control means, said back pressure detecting and control means, said bleeder pressure detecting and control means each includes detector means for producing a signal proportional to and corresponding respectively to the speed, back pressure and bleeder pressure of the turbine, preset means for producing a signal having a desired level in comparison to the signal produced by said detector means, comparator means connected to said detector means and said preset means for producing a signal proportional to the difference between said detector and preset signals, and control means for generating one of said respective electrical signals in response to said comparator signal.